Nov. 18, 1958  L. H. IRELAND  2,860,845
AIRCRAFT TRAILING MEMBER RELEASE AND REENTRY MECHANISM
Filed Aug. 4, 1954  2 Sheets-Sheet 1
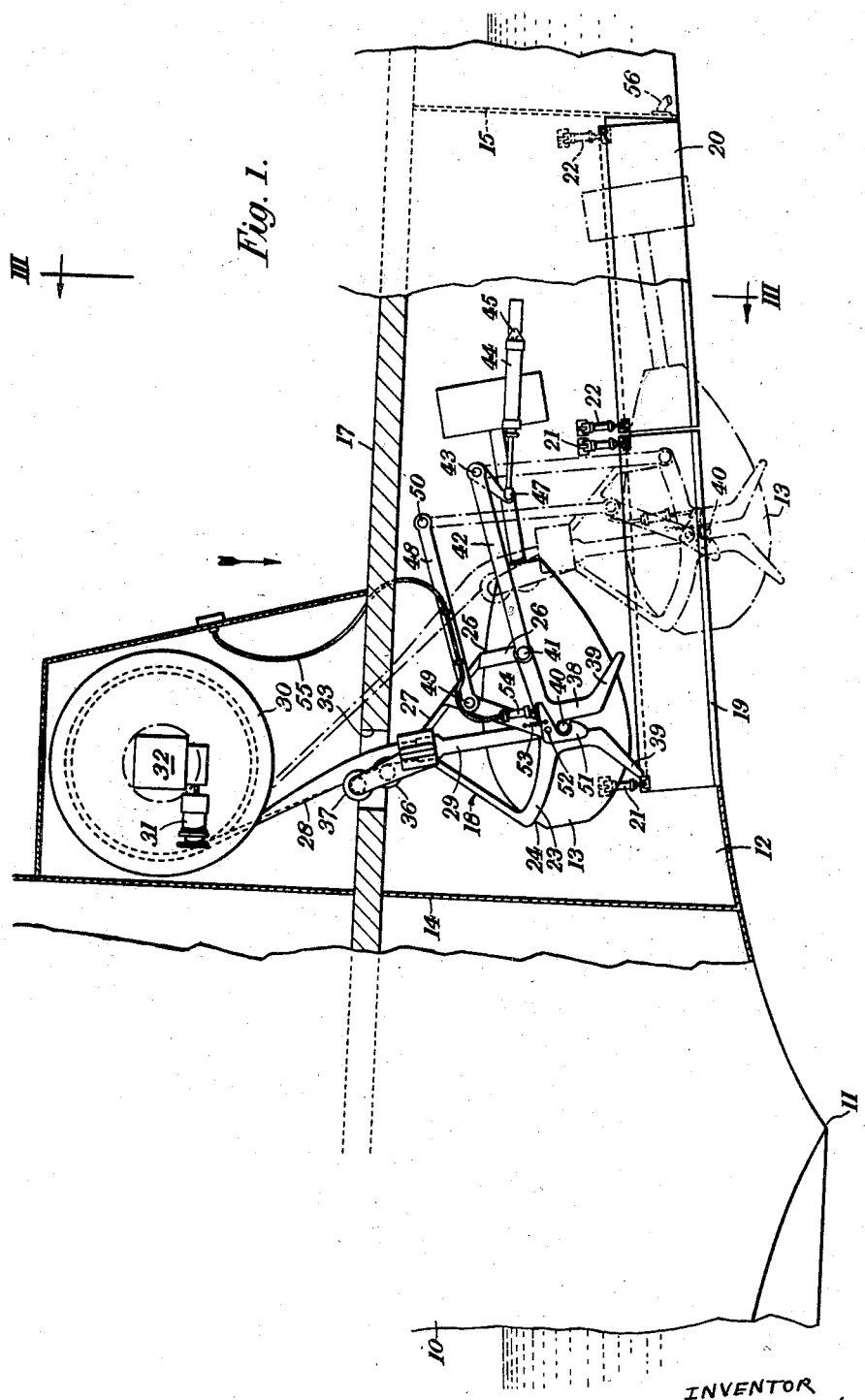
INVENTOR
Lionel H. Ireland
By Watson, Cole, Grindle & Watson
ATTORNEYS Nov. 18, 1958 L. H. IRELAND 2,860,845
AIRCRAFT TRAILING MEMBER RELEASE AND REENTRY MECHANISM
Filed Aug. 4, 1954 2 Sheets-Sheet 2
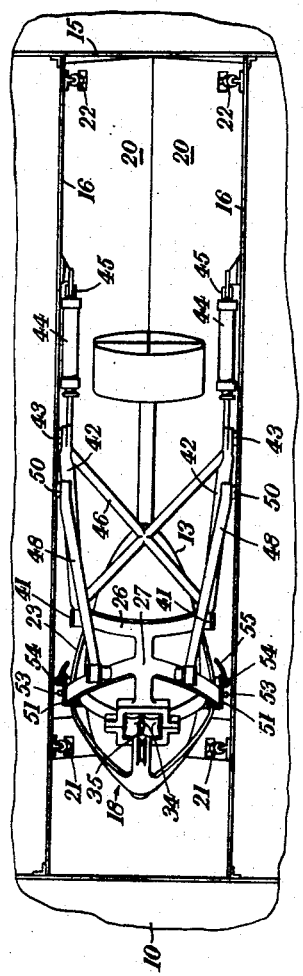
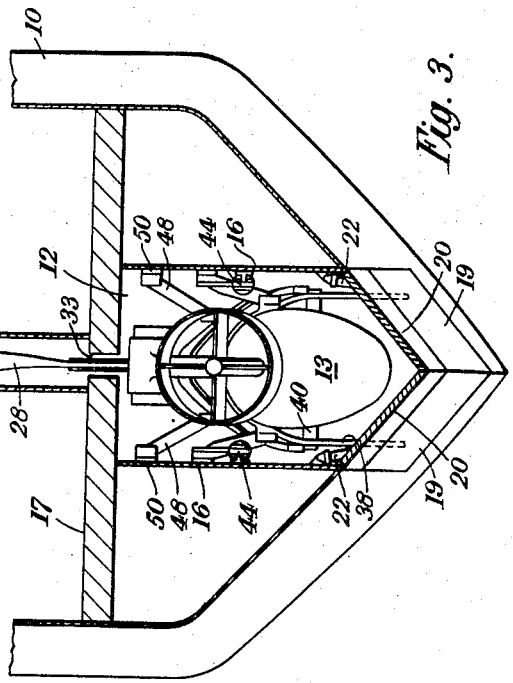
INVENTOR
Lionel H. Ireland
By Watson, Cole, Grindle & Watson
ATTORNEYS

2,860,845

AIRCRAFT TRAILING MEMBER RELEASE AND REENTRY MECHANISM

Lionel Hugh Ireland, Cowes, Isle of Wight, assignor to Saunders-Roe Limited, East Cowes, Isle of Wight, England, a British company Application August 4, 1954, Serial No. 447,782

6 Claims. (Cl. 244—1)

This invention relates to a mechanism for the stowage, release lowering and elevating of a hydrodynamic or aerodynamic device from the body of an airborne craft or alternatively the hull of a flying boat or surface craft, whilst waterborne. The device is lowered or elevated from the craft by means of a cable which may contain electrical leads, dependent on the nature and the purpose of said device. The installation provides for the controlled and safe release from and re-entry of the device into the body of the craft, whether said craft be stationary or moving.

Accordingly references herein to a craft are to be understood as referring to a flying boat, a surface craft, an aircraft or an airship and references to an enclosure are to be understood as referring to a suitable compartment for housing the cradle, and the sonar member or other object carried thereby, in the hull of a flying boat or surface craft, in the body of a helicopter or other aircraft or in the cabin of an airship.

The invention provides apparatus for releasing from and retracting into an enclosure within a craft a cable attached to a sonar member or other object, comprising a power-operated cable drum housed within the enclosure, a cradle for supporting said object, said cradle carrying guide rollers for the cable, and a pair of spaced forked guides for accommodating trunnions projecting from opposite sides of the object, the guides being flared at their lower ends, a linkage connecting the cradle to the craft, and a jack or the equivalent for moving the cradle from a restricted position, in which it is housed within the enclosure, and a projected position in which the flared lower ends at least of the guides project beneath the craft.

The invention is of particular application to the case of release from and retraction into the hull of a flying boat or surface craft of the device known as an active sonar, which serves to convey intelligence to the personnel of the boat through electrical leads in the cable. One specific embodiment of the invention, as applied to a flying boat and associated sonar, will now be described in detail, by way of example, with reference to the accompanying drawings, in which:

Fig. 1 is a side elevation, partly in section, of part of the hull showing the compartment for housing the sonar, Fig. 2 is a plan view of the compartment and Fig. 3 is a section on the line 111—111 in Fig. 1.

Within the hull 10 of the flying boat and behind the main step 11 is a compartment 12 to house a sonar member 13. The compartment is closed fore and aft by watertight bulkheads 14, 15 and at the sides by watertight bulkheads 16 and extends up to the level of the deck 17, which is disposed above the water line. The sonar 13 is supported by a cradle 18, which is movable at later described from a retracted position, shown in full lines in Fig. 1, in which it is housed within the compartment 12, to a projected position shown in chain-dotted lines in Fig. 1. Two pairs of doors 19, 20 are provided for closing the bottom of the compartment and jacks 21, 22, which are remotely operable from within the hull, are provided for opening and closing the doors.

The cradle 18 has a pair of side members 23, which converge and meet at the front of the cradle to afford support for the sonar at the point 24 and are joined by a member 25 which affords support for the sonar at a point 26 spaced aft from the point 24. The cradle includes a superstructure 27 for supporting guide rollers for a cable 28 attached at its lower end to a towing bridle 29 on the sonar member 13.

The cable 28 is of substantially aerofoil section and is coiled flat on a cable drum 30 located above the deck 17. The drum 30 is mounted to rotate on an axis transverse to the aircraft and is driven from a suitable motor 31 through a gear box 32. The cable 28 extends downwardly through a hole 33 in the deck and the portion thereof attached to the towing bridle 29 of the sonar has the leading edge of the cable facing forwardly. The cable is thus twisted through 90° on its passage from the drum to the towing bridle. This is achieved by the guide rollers. They comprise a lower cooperating pair 34, mounted for rotation about axes parallel to the fore and aft axis of the cradle and grooved to provide a nip 35 (Fig. 2) conforming with the section of the cable and two spaced upper rollers 36, 37 for engaging the leading edge of the cable.

Each side member 23 of the cradle is extended downwardly to provide a forked downwardly extending guide 38 having outwardly flared legs 39. These guides serve to accommodate locating trunnions 40 projecting from opposite sides of the sonar. Pivoted at 41 to the aft ends of the side members 23 of the cradle are the long arms of bell cranks 42, pivoted at 43 to the hull. The shorter arms of the bell cranks are pivoted at 47 to jacks 44 which are pivoted at their other ends 45 to the hull. A bracing structure 46 (Fig. 2) connects the two bell cranks 42. The jacks may be operated in any appropriate way, e. g. electrically, hydraulically or pneumatically, to move the cradle from the retracted to the projected position and vice versa. Steady links 48 are provided at each side of the cradle, these links extending parallel to the long arms of the bell cranks 42 and being pivoted at their opposite ends 49, 50 to the cradle and to the hull.

Locks 51 are provided at each side of the cradle for locking the sonar member to the cradle. Each lock is pivoted at 52 to the cradle and urged by a spring 53 to close automatically on the associated trunnion 40 on the sonar. A hydraulic jack 54 is associated with each lock and may be supplied with liquid from the interior of the hull through a flexible pipe 55 when it is desired to release the lock. Similar locks, not shown but arranged to engage automatically by spring action and releasable under remote control, are provided for locking the cradle or its actuating linkage to the hull when the cradle is in its retracted position.

When it is desired to dip the sonar, the doors 19, 20 are opened, by means of the jacks 21, 22, the locks connecting the cradle to the hull are released and the jacks 44 are operated to move the cradle to the projected position shown in chain dotted lines in Fig. 1. In this position the trunnions 40 on the sonar are level with the bottom of the hull and the long arms of the bell cranks 42 and the steady links 48 extend substantially vertically to support the cradle. The locks 51 are then released by the jacks 54, and the cable 26 is payed out. When it is desired to tow the sonar, the cradle is returned to its retracted position shown in full lines in Fig. 1 and the aft doors 20 are closed, the forward doors 19 remaining open and permitting of passage of the cable through the hull bottom. The doors 20 are opened and the cradle moved to projected position prior to winding in the cable. When the cable is wound in, the trunnions 40 on the sonar will normally engage the inner faces of the flared portions of the legs 39 of the forked guides 38 to ensure entry of the sonar into the cradle. If they should, instead, strike the outer faces of the legs, the cable can be payed out slightly and hereafter retracted again to engage the trunnions 40 in the guides 38. After the trunnions 40 have engaged the guides 38, the cradle is moved to its retracted position and the flying boat may then take-off. Valves 56 in the hull bottom aft of the doors 20 allow escape of water from the compartment 12 during the take-off.

What I claim as my invention and desire to secure by Letters Patent is:

1. In a craft, apparatus for projecting into position beneath the craft from an enclosure within said craft an object having trunnions projecting from opposite sides thereof, said apparatus comprising a cradle shaped to fit against the sides of said object, and including a pair of spaced forked downwardly extending guides for accommodating said trunnions, each of said guides being outwardly flared at its lower end, a superstructure projecting above said cradle, guide rollers mounted on said superstructure, a power-operated cable drum mounted within said enclosure, a cable extending from said drum and around said guide rollers and attached at its free end to said object, a linkage connecting said cradle to said craft, and power means for moving said cradle between a retracted position, in which it is housed within said enclosure, and a projected position in which the flared lower ends at least of said guides project beneath said craft.

2. In an aircraft, apparatus for projecting into position beneath said aircraft from an enclosure within said aircraft, a sonar buoy having trunnions projecting from opposite sides thereof, said apparatus comprising a cradle shaped to fit against the sides of said sonar buoy and including a pair of spaced forked downwardly extending guides for accommodating said trunnions, each of said guides being outwardly flared at its lower end, a superstructure projecting above said cradle, guide rollers mounted on said superstructure, a power-operated cable drum mounted within said enclosure, a cable extending from said drum and around said guide rollers and attached at its free end to said buoy, a linkage connecting said cradle to said aircraft, and power means for moving said cradle between a retracted position, in which it is housed within said enclosure, and a projected position in which the flared lower ends at least of said guides project beneath said aircraft.

3. In an aircraft, apparatus as claimed in claim 2, wherein said cable is of streamline section having a bulbous leading edge and a tapering trailing edge, said cable being coiled flat on said drum, and wherein said guide rollers comprise a lower pair grooved to provide a nip conforming in shape with the section of said cable and at least one upper roller for engaging the leading edge of said cable between said drum and said lower pair of rollers and guiding said cable to present its leading edge forwardly as it enters the nip between said lower rollers.

4. In a flying boat having a hull and a main step, apparatus as claimed in claim 1, said enclosure being disposed in the hull aft of the main step.

5. In a flying boat having a hull and a main step, apparatus as claimed in claim 1, said enclosure being disposed in the hull aft of the main step and comprising doors for closing the bottom of said enclosure and a valve in the bottom of the hull aft of said doors for allowing escape of water from said enclosure during take-off of the flying boat.

6. In a craft, apparatus for projecting into position beneath the craft from an enclosure within said craft, an object having trunnions projecting from opposite sides thereof, said apparatus comprising a cradle shaped to fit against the sides of said object, and including a pair of spaced forked downwardly extending guides for accommodating said trunnions, each of said guides being outwardly flared at its lower end, a superstructure projecting above said cradle, a self-closing lock for locking said object to said cradle, a device operable by remote control from within the craft for releasing said lock when the cradle is in its projected position, guide rollers mounted on said superstructure, a power-operated cable drum mounted within said enclosure, a cable extending from said drum and around said guide rollers and attached at its free end to said object, a linkage connecting said cradle to said craft, and power means for moving said cradle between a retracted position, in which it is housed within said enclosure, and a projected position in which the flared lower ends at least of said guides project beneath said craft.

References Cited in the file of this patent

UNITED STATES PATENTS

| | | |
|---|---|---|
| 1,523,190 | Germain | Jan. 13, 1925 |
| 1,756,972 | Conner | May 6, 1930 |
| 2,361,177 | Chilowsky | Oct. 24, 1944 |
| 2,585,030 | Nosker | Feb. 12, 1952 |
| 2,604,353 | Pierson | July 22, 1952 |